(12) United States Patent
Noehte et al.

(10) Patent No.: US 7,405,851 B2
(45) Date of Patent: Jul. 29, 2008

(54) METHOD FOR IDENTIFYING ARTICLES

(75) Inventors: Steffen Noehte, Weinheim (DE);
Christoph Dietrich, Heidelberg (DE);
Matthias Gerspach, Dossenheim (DE);
Jörn Leiber, Hamburg (DE); Stefan Stadler, Hamburg (DE)

(73) Assignee: Tesa scribos GmbH, Heidelberg (DE)

( * ) Notice: Subject to any disclaimer, the term of this patent is extended or adjusted under 35 U.S.C. 154(b) by 0 days.

(21) Appl. No.: 10/312,466

(22) PCT Filed: Jun. 22, 2001

(86) PCT No.: PCT/EP01/07119

§ 371 (c)(1),
(2), (4) Date: Sep. 9, 2003

(87) PCT Pub. No.: WO02/01487

PCT Pub. Date: Jan. 3, 2002

(65) Prior Publication Data

US 2004/0051919 A1    Mar. 18, 2004

(30) Foreign Application Priority Data

Jun. 28, 2000  (DE) .............................. 100 30 629

(51) Int. Cl.
*G03H 1/00* (2006.01)
*G03H 1/08* (2006.01)
*G03H 1/04* (2006.01)

(52) U.S. Cl. .................. 359/9; 359/2; 359/35

(58) Field of Classification Search ............ 359/2, 359/1, 569, 9, 35, 3, 25, 567; 283/86, 85, 283/72; 235/457; 430/1

See application file for complete search history.

(56) References Cited

U.S. PATENT DOCUMENTS 4,111,519 A * 9/1978 Gillis et al. .................. 359/9
4,510,575 A * 4/1985 Mueller et al. .............. 358/1.1

(Continued)

FOREIGN PATENT DOCUMENTS

DE    198 02 712    8/1999

(Continued)

OTHER PUBLICATIONS

Michelin, S. et al., "Fourier-Transform Computer-Generated Hologram: A Variation of the Off-Axis Principle" Journal of Fish Biology, Feb. 1994.

(Continued)

*Primary Examiner*—Audrey Y Chang
(74) *Attorney, Agent, or Firm*—Christa Hildebrand; Norris McLaughlin & Marcus, PA

(57) ABSTRACT

The invention relates to a method for identifying articles, wherein article identification data are made available and the article is provided with a hologram representing said data so that the article can be identified by way of an intensity profile corresponding to said hologram. To this end, article-identifying individual data are provided, a hologram profile is digitally calculated using said individual data, and an intensity modulation of the hologram-producing beam is determined. The hologram-producing beam transfers the hologram pixels onto a hologram support that is associated with the article to be identified so that the article can be identified by way of the intensity profile reproduced from the associated hologram support.

13 Claims, 8 Drawing Sheets

U.S. PATENT DOCUMENTS

| | | | | |
|---|---|---|---|---|
| 5,306,899 A | * | 4/1994 | Marom et al. | 235/382 |
| 5,422,744 A | | 6/1995 | Katz et al. | 359/2 |
| 5,504,515 A | | 4/1996 | Zertani et al. | |
| 5,570,207 A | | 10/1996 | Chang | 359/2 |
| 5,587,984 A | * | 12/1996 | Owa et al. | 369/103 |
| 5,729,365 A | | 3/1998 | Sweatt | 359/2 |
| 5,886,798 A | | 3/1999 | Staub et al. | 359/2 |
| 5,920,058 A | | 7/1999 | Weber et al. | 235/457 |
| 5,999,280 A | * | 12/1999 | Huang | 359/2 |
| 6,036,810 A | | 3/2000 | Holat | 156/248 |
| 6,222,650 B1 | * | 4/2001 | Long | 359/2 |

FOREIGN PATENT DOCUMENTS

| | | |
|---|---|---|
| DE | 198 06 295 | 8/1999 |
| EP | 0 568 186 | 11/1993 |
| EP | 0 582 251 | 2/1994 |
| EP | 0 712 012 | 5/1996 |
| EP | 0 762 238 | 3/1997 |
| WO | WO 93/12506 | 6/1993 |

OTHER PUBLICATIONS

Urguhari, K.S. et al., "Computer-Generated Holograms Fabricated by Direct Write of Position Electron-Beam Resist" Optics Letters, Optical Society of America, Washington, US, Feb. 15, 1993.

* cited by examiner

INTENSITY PATTERN
FIG_1

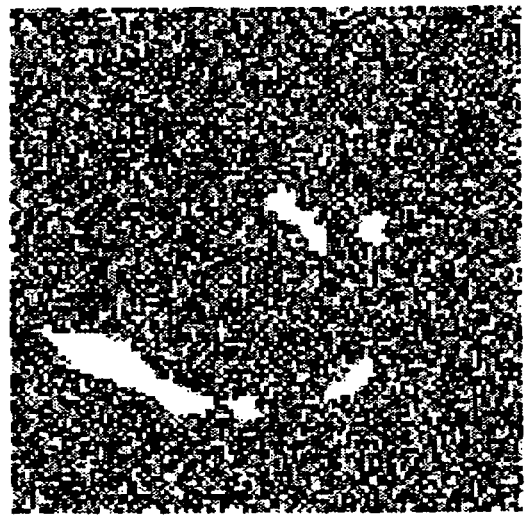
INTENSITY PATTERN (TOP) AND
RANDOM PHASE PATTERN (BELOW)
FIG_2

HOLOGRAM RELATING TO FIGS 1 AND 2

REPRODUCTION PATTERN RELATING TO FIG. 3

FIG_4

INTENSITY PATTERN AND ARTIFACT-PRODUCING PHASE PATTERN

FIG_5

HOLOGRAM RELATING TO FIG. 5

REPRODUCTION PATTERN RELATING TO FIG. 6

METHOD FOR IDENTIFYING ARTICLES

DESCRIPTION

The present invention relates to the preambles of the independent claims. The present invention therefore generally concerns the use of holograms for identifying products.

The use of holograms for identifying products is already generally wide spread nowadays. For example, a frequent application is the attachment of holograms to check or debit cards or software packages in order to make their forgery more difficult. The product security obtained by attaching holograms is based on the comparatively complicated production of holograms, the product identification therefore serves as a protection against forgery.

Frequently, however, it is also required not only to ensure the authenticity of a product but also to add other specific information on the product, for example charge numbers, delivery routes, etc., in addition to information on the manufacturer. Here, the product security is increased by better identification of the article.

There is already optical encoding for the storage of product information, for example bar codes and the like. However, these are firstly easy to falsify, often produce errors when being read out and only inadequately cover the requirement of accommodating increasing amounts of data in product information.

The object of the present invention is to provide innovation for commercial application.

The achievement of this object is claimed independently. Preferred embodiments will be found in the dependent claims.

The present invention therefore firstly proposes a method for identifying articles in which article identification data is provided and a hologram corresponding to this data is applied to the article in order to identify the article by using an intensity pattern corresponding to the hologram, provision being made for article-identifying individual data to be provided, a hologram pattern to be calculated digitally by using the individual data, intensity modulation of a hologram-producing ray to be determined and hologram pattern points to be transferred with the modulated hologram-producing ray to a hologram carrier assigned to the article to be identified, in order in this way to make it possible to identify the articles by using the intensity pattern reproduced from the associated hologram carrier.

The present invention has therefore recognized the fact that individualization of the product information can be implemented simply if an intensity pattern that can be used for identification is determined and a hologram is calculated from this, which is written into a data carrier associated with the product or to be associated with the product, by using a modulated individual ray. Therefore, by means of simple steps, the use of holograms for product identification is significantly improved.

Provision can be made for the first intensity pattern to be determined on the basis of individual pictures, for example of the user of a check card or the like, or on the basis of data, for example a charge number. Clearly, a combination of pictures and data, for example a passport picture, account information, date of birth and the like, can also be used jointly for the hologram in order to determine the first identity pattern. Here, the data can be encoded and converted in binary form into an intensity pattern; however, in a preferred variant, individualization by the data is important.

In a preferred exemplary embodiment, the intensity pattern is initially assigned a hologram in array form. Here, the intensity pattern array can be determined on the foundation and the two-dimensional arrangement of serial data, and/or the intensity pattern is scanned pixel by pixel as required, if appropriate following conversion into gray values. In other words, a two-dimensional array is assigned to the individual data. The hologram can be determined as a Fourier hologram in a manner known per se. It is preferable for the hologram to comprise an array which is at least twice as large as the initial intensity pattern, in order to avoid Aliasing effects, in particular, but not necessarily, in each linear direction. The hologram can then be written into the data carrier region by region, in particular point by point. In a preferred embodiment, writing is carried out by means of a single ray, for example with a laser beam; alternatively, other individual focusable beams can be used for writing to the data carrier, for example electron beams.

The hologram will preferably represent a hologram with a plurality of gray value stages.

If the hologram is stored as a gray value hologram, use can be made of the fact that the data to be stored merely needs to be contained in the intensity-pattern. In order to determine a hologram, however, not only information about the lightness, that is to say the spatial intensity distribution of a pattern or object, is required, but also information about the phase angle which a predefined light wave is to have on the object.

During the calculation of the holograms, for example as Fourier holograms, it is then possible to predefine any desired phase pattern arbitrarily. This is a significant difference as compared with the exposure, for example, in conventional optical two-beam holography. The invention now proposes, using this, in a preferred embodiment, to determine the phase to be added arbitrarily to the intensity pattern, that is to say the phase pattern, in such a way that the extensive homogenization of the gray values over the hologram area is achieved; without such homogenization, very intense exposure, that is to say carrier material change, is required at specific, typically central, points of the hologram, while at other points only low exposure is needed. This requires, firstly, very high dynamics during the storage and, secondly, destruction of the central point leads, during reading, to a high loss of contrast and/or information in the intensity pattern reproduced from the hologram, that is to say in the reproduction pattern. These disadvantages can be compensated for by the hologram gray-value homogenization according to the invention. This relieves the requirements on the exposure (or irradiation) device and on the hologram carrier material to the same extent.

For instance, the variance of the intensity associated with each hologram point (that is to say the gray value) over the hologram area can be used as a measure of the homogeneity of the hologram intensity over the area and therefore the suitability according to the invention of the phase field to be allocated. According to the invention, holograms with generally lower gray value variability are preferable. The individualization according to the invention also makes it possible to determine holograms from one and the same intensity pattern by using the different phase patterns, in each case to determine the homogeneity of the hologram intensity and then to select a hologram with a particularly pronounced homogeneity.

Therefore the overall signal/noise ratio improves and a lower amount of information is deposited in a single region. This increases the security against the destruction of the hologram during the subsequent, product handling, for example during the transport of packages if the product-identifying hologram represents a package label.

The phase pattern to be processed together with the intensity pattern during the hologram calculation, which in intensity pattern arrays will have the same size as the intensity field, can moreover be configured in such a way that artifacts occur in the intensity pattern reproduced from the hologram, that is to say the reproduction pattern. In particular, it is preferred to use a phase pattern which produces periodic artifacts in the reproduction pattern. It is, furthermore, particularly preferred to change the intensity pattern in such a way that no intensity information needs to be stored at the artifact points, but that the points of the expected and desired artifacts remain free of intensity information. This can possibly be achieved by basic data to be stored, used for product information or article identification being grouped appropriately around the expected artifact points when determining the hologram, if appropriate a corresponding safety margin around the artifact points being maintained.

The addition of a phase pattern that produces artifacts and in particular at the same time homogenizes gray values to the intensity pattern is preferred, since the artifacts can be readily identified in a reproduction pattern, and then the reproduced pattern can be scaled and/or oriented by using the artifacts. For example, it is possible to use a phase pattern which produces a grid-like, periodic artifact reproduction pattern. The spacing of the artifact points, which can readily be identified, can then be used for scaling.

It is possible to expose a data carrier either directly on the product or to join the product in one piece to the data carrier in order to expose the authenticity information or, alternatively, first to expose a data carrier, such as a self-adhesive label, and then to apply it to the product. The data carrier material considered is, in particular, a self-adhesive polymer material, in particular a stretched polymer. In this connection, reference is made in particular to the materials listed in the German Utility Model Application 298 16 802.2.

Protection is also claimed for the data carrier and a product having a data carrier area according to the claims based thereon.

The invention will be explained merely by way of the example below, with reference to the appended drawing, in which:

FIG. 1 shows an example of an intensity pattern;

FIG. 2 shows a random phase belonging to the intensity pattern field from FIG. 1;

Figure 8:
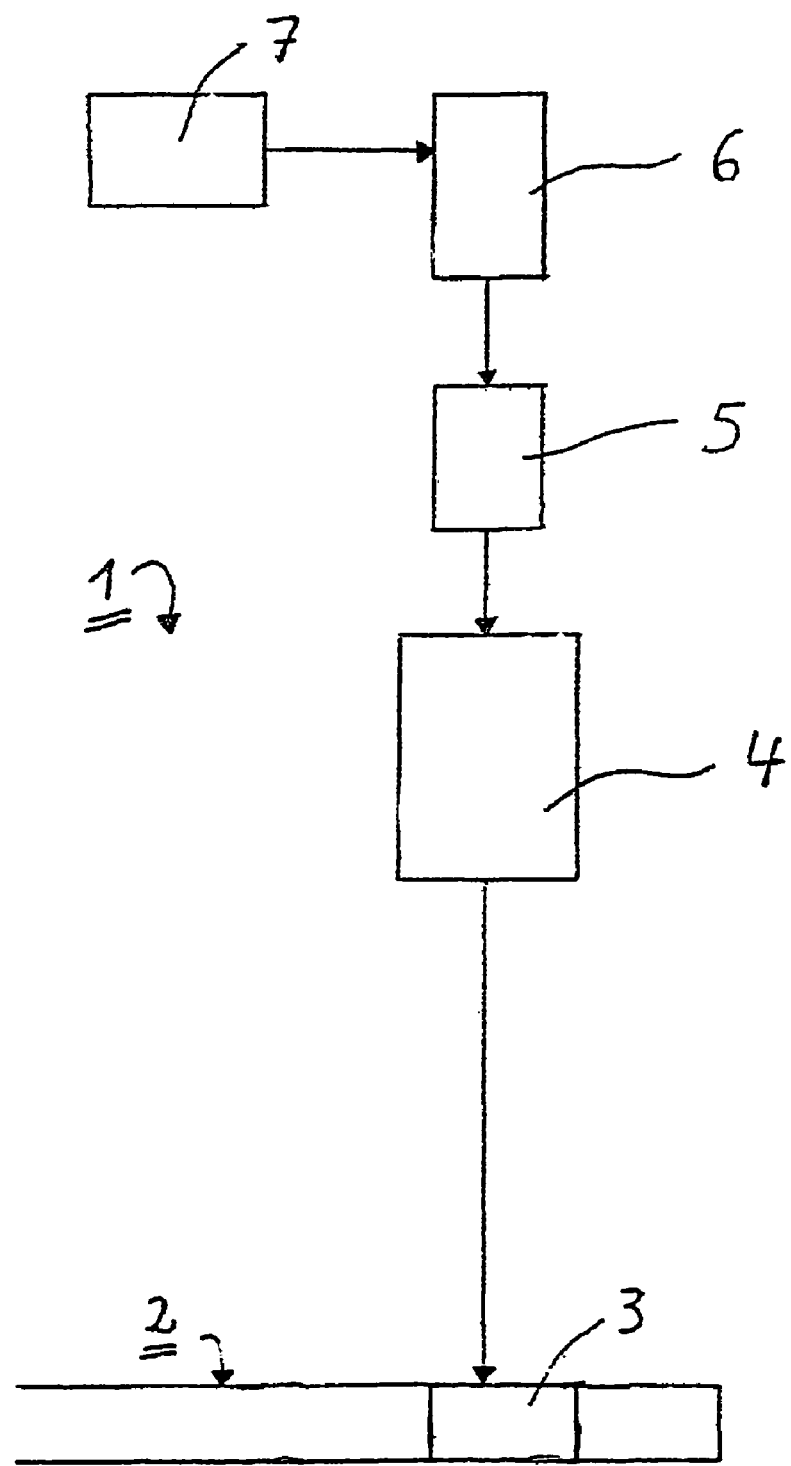
FIG. 8 shows an arrangement for producing a hologram for identifying articles.

According to FIG. 8, an arrangement 1 designated generally by 1, with which a hologram 3 can be produced on an article 2 in order to identify the article 2, comprises an individual ray laser 4, which is fed by a modulated power supply 5. The modulation of the power supply 5 is produced in a computer 6 on the basis of article identification data fed into said computer or produced therein, visualized by a photograph 7.

The hologram carrier 3 consists of a polymer material, in particular one as disclosed in German Utility Model 298 16 802.2.

The following text is intended to specify how the article-identifying hologram is produced.

This is done with reference to FIGS. 1 to 7. FIG. 1 shows an example of an intensity pattern, as can be used for article identification. This predefined intensity pattern is firstly assigned a stochastically produced phase field, see FIG. 2. The Fourier hologram calculated with this phase field in a manner known per se has a homogenized gray value distribution over the entire hologram field, see FIG. 3.

Figure 3:
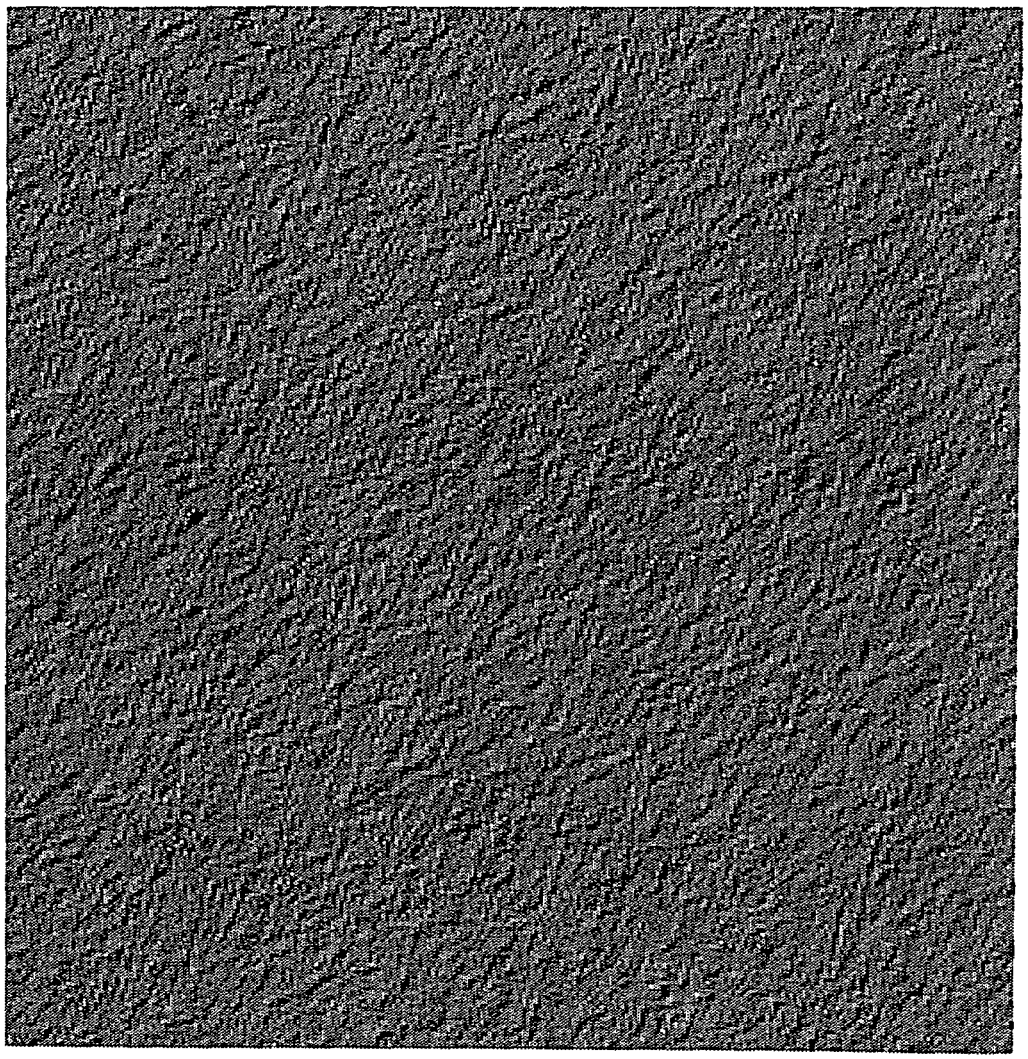
FIG. 3 shows the hologram homogenized with the random phase gray value.
Figure 4:
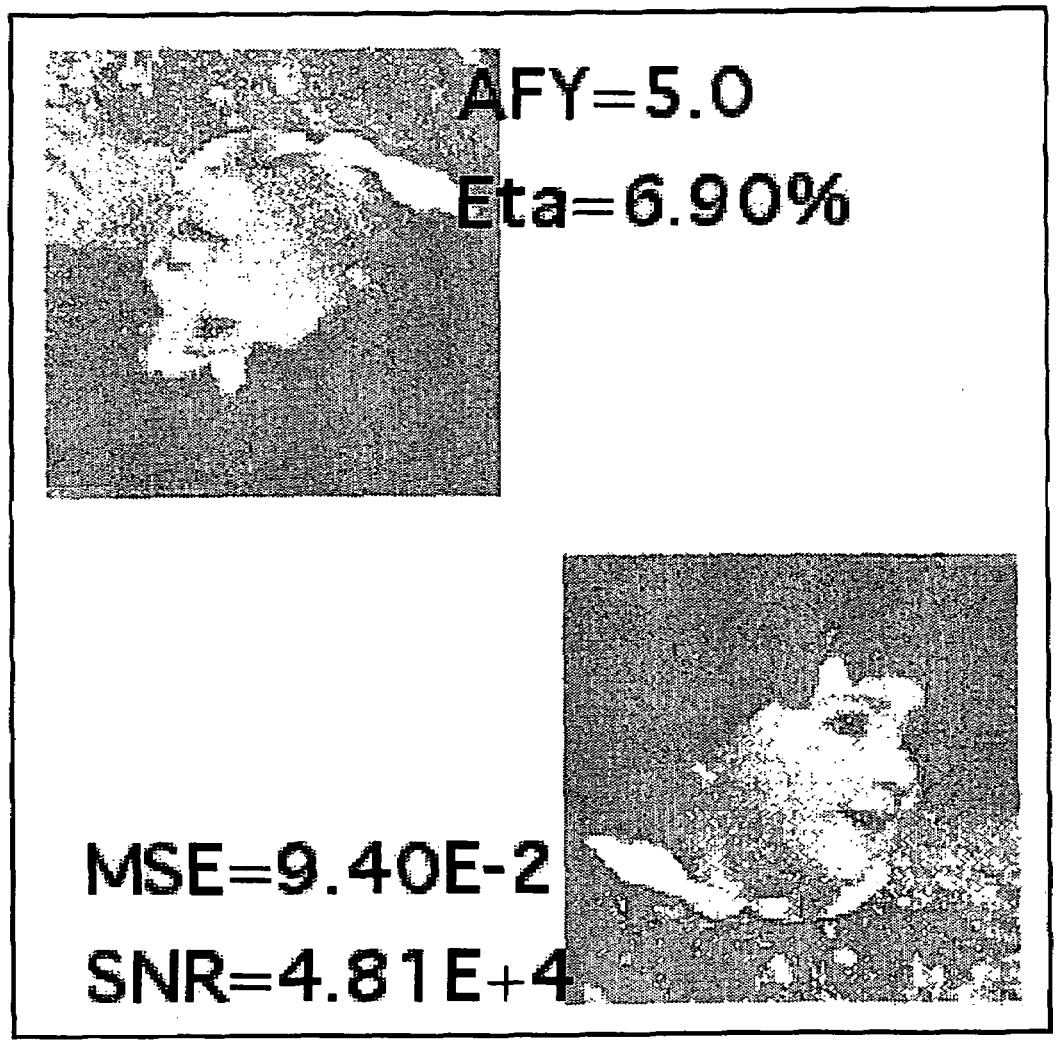
FIG. 4 shows the reproduction pattern with inserted assessment identification numbers.

The intensity pattern produced from this hologram, the reproduction pattern, is then intended largely to correspond to the initial intensity pattern from FIG. 1. FIG. 4 shows the reproduction pattern obtained with the random phase from FIG. 2, various assessment numbers, in particular the signal/noise ratio, also being printed in the picture and the picture being standardized with respect to specific properties. It can be seen that the contrast is not particularly high.

Figure 5:
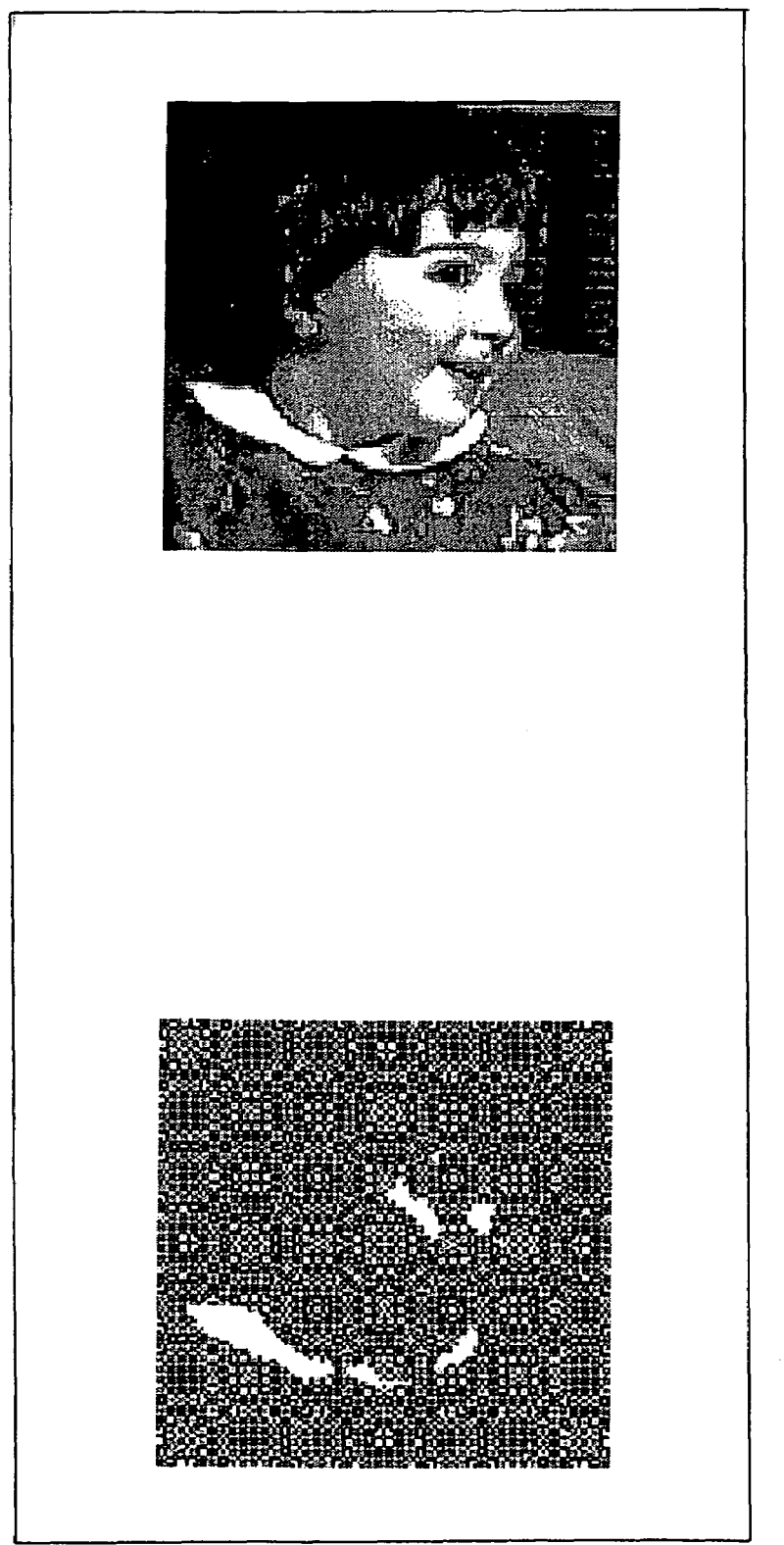
FIG. 5 shows a further phase pattern.

FIG. 5 shows a further phase pattern which, instead of the random phase shown in fig. 2, can be assigned to the intensity pattern when determining the hologram. It can be seen that the phase pattern has periodic structures which, moreover, vary outward from the period points.

Figure 6:
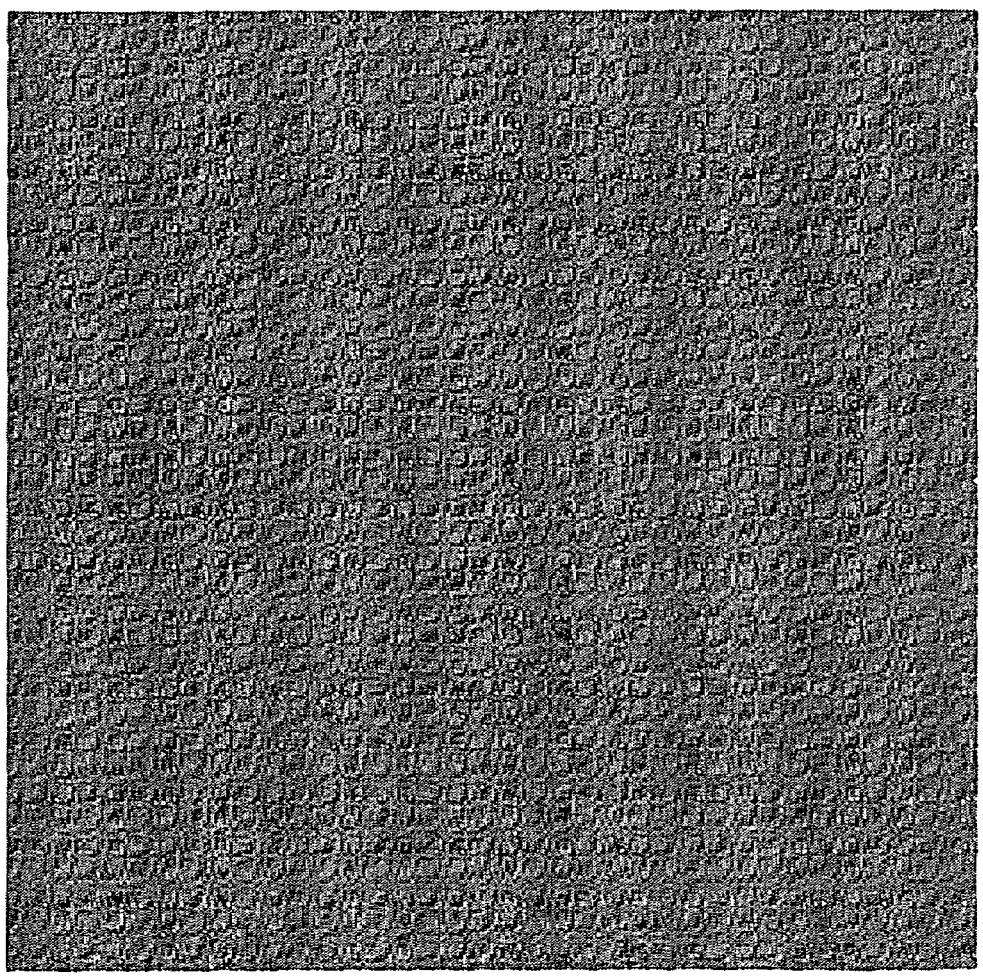
FIG. 6 shows the hologram belonging to the intensity pattern from FIG. 1 and the phase pattern from FIG. 5.
Figure 7:
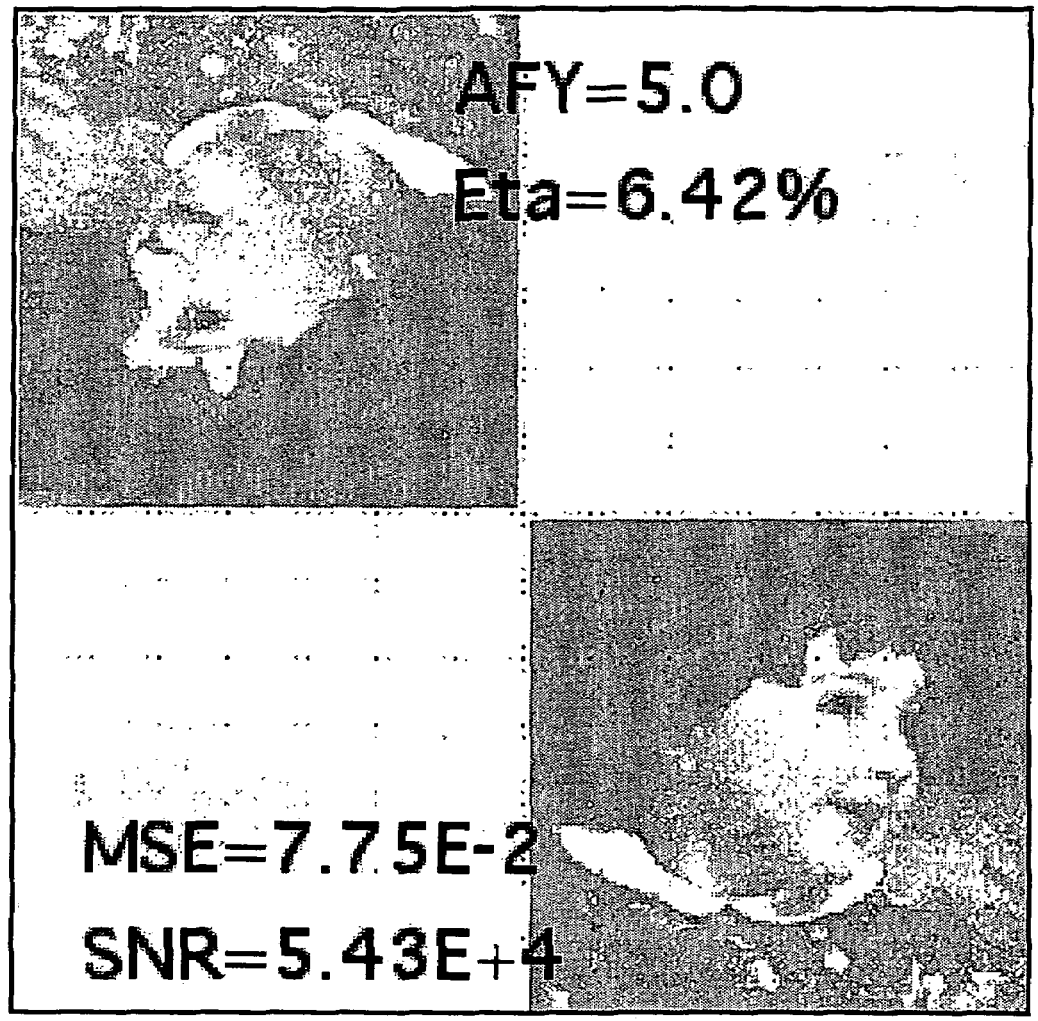
FIG. 7 shows the reproduction pattern relating to the hologram from FIG. 6.

The calculated Fourier hologram belonging to the phase field from FIG. 5 and the picture from FIG. 1 is shown in FIG. 6, and it can be seen that the periodicity of the phase pattern has an effect in the periodicity of the hologram. During the reconstruction of the intensity patterns from the phase pattern having a periodic artifact, the pattern of FIG. 7 is obtained as reproduction pattern. It can be seen that here there is a series of periodically occurring diffraction maxima which are distributed grid-like over the picture and can be used for scaling the picture. Furthermore, the signal/noise ratio in the reproduction pattern from FIG. 7 is better than in the variant with random phase. This is true although the artifacts nominally worsen the signal/noise ratio and although hologram gray-value homogenization already occurs as a result of the random phase. It should be mentioned that the signal/noise ratio of the reproduction pattern represents a very, good measure of the quality of the phase field used, particularly if regions with knowingly produced artifacts are not considered. This signal/noise ratio can be used instead of or in addition to the gray value variability as a measure of the suitability of a predefined phase pattern.

The example shows that the use of a phase pattern with periodicity is firstly more suitable to bring about scalability of the hologram and secondly, as a result of the homogenization of the hologram gray values with such a phase pattern, the area required for reliable identification with a predefined signal/noise ratio is reduced considerably as compared with other phase patterns.

The method of the present invention can therefore be used to make it possible to use, in particular, small identification areas on articles.

Instead of polymer materials, other media can also be used. Instead of Fourier holograms, other hologram types can also be used.

The invention claimed is:

1. A method for producing holograms as identification areas provided on articles, said articles being identifiable using an intensity pattern reproduced from the hologram, said method comprising:

providing article identification data in a two dimensional array;

digitally calculating a two dimensional pattern of hologram interference fringes on the basis of said two-dimensional array providing a modulation for writing each part of said two dimensional pattern of hologram interference fringes point-by-point onto a data carrier using a laser as a hologram writing means;

said article identification data provided as individual article identification data;

the laser used as the hologram writing means being a single ray laser fed from a power supply;

modulating said power supply to provide an intensity modulation to the laser ray for hologram writing; and wherein such data carrier is a polymer applicable to the article.

2. The method according to claim 1, wherein:

said individual article identification data comprise individual article identification bits;

and said step of providing article identification data in a two dimensional array comprises distributing the individual article identification bits in a two-dimensional array, the two-dimensional array having a number of array elements larger than the number of individual article identification bits; and wherein additional filler data bits are provided at predetermined data array elements, the distributing of filler data bits upon digitally calculating the hologram fringe pattern produce artifacts at predetermined positions in the intensity pattern reproduced from the hologram.

3. The method according to claim 2, wherein the predetermined positions of the artifacts ensure that said intensity pattern of said hologram reproduced from the pattern of hologram interference fringes can be scaled and/or oriented on the basis of the predetermined positions of the artifacts.

4. The method according to claim 1 wherein said data carrier written on is applied to the article after writing.

5. The method according to claim 1 wherein said data carrier written on is a self-adhesive hologram carrier applied to the article.

6. The method according to claim 1 wherein said data carrier written on is a stretched polymer.

7. The method according to claim 1 wherein the modulation of said writing laser ray intensity produces a plurality of different gray levels.

8. The method according to claim 1 wherein digitally calculating said two-dimensional pattern of hologram interference fringes on the basis of said two-dimensional array comprises adding phase information, said phase information being selected to ensure that artifacts at predetermined positions are created in the intensity pattern of the hologram produced from said pattern of hologram interference fringes.

9. The method according to claim 8 wherein the predetermined positions of said artifacts created in the intensity pattern of the hologram reproduced from said pattern of hologram interference fringes are chosen so as to ensure that the intensity pattern of the hologram produced from said pattern of hologram interference fringes can be scaled and/or oriented on the basis of the artifacts.

10. A product comprising a data carrier in which a hologram is provided for product identification, said hologram representing a hologram fringe pattern written into the data carrier point by point using the method according to claim 1.

11. A pair of first and second products according to claim 10, each of said first and second products being individually identifiable using an intensity pattern reproduced from the hologram, said intensity being a pattern individual for each of said products but having artifacts therein that are substantially identical.

12. The product of claim 10 wherein the data carrier is a stretched polymer.

13. A data carrier to be attached to a product, the data carrier comprising a hologram provided for product identification, said hologram representing a hologram fringe pattern written into the data carrier point by point using the method according to claim 1.

* * * * *